(No Model.)
W. B. PURVES
DOOR BOLT.
No. 257,141. Patented Apr. 25, 1882.
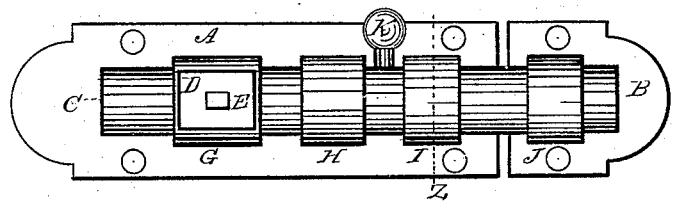
FIG. I.
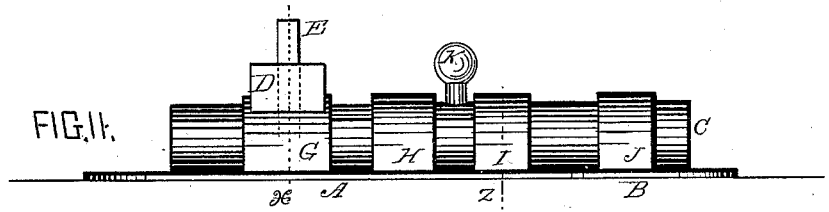
FIG. II.
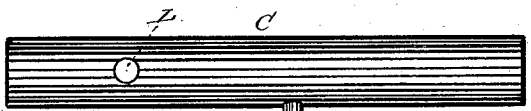
FIG. III.
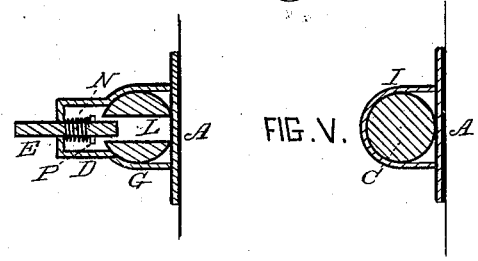
FIG. IV.    FIG. V.
WITNESSES.
E. M. Strong.
A. L. Cummings.
INVENTOR.
William B. Purves.
By G. L. Chafin.
Atty.

UNITED STATES PATENT OFFICE.

WILLIAM B. PURVES, OF CHICAGO, ILLINOIS, ASSIGNOR TO HIMSELF AND WILLIAM LINDEN, OF SAME PLACE.

DOOR-BOLT.

SPECIFICATION forming part of Letters Patent No. 257,141, dated April 25, 1882.

Application filed February 18, 1882. (No model.)

*To all whom it may concern:*

Be it known that I, WILLIAM B. PURVES, of Chicago, in the county of Cook and State of Illinois, have invented a new and useful Improvement in Fasteners for Door-Bolts, of which the following is a specification, reference being had to the accompanying drawings, illustrating the invention and improvement, in which—

Figure 1 is face view of a door-fastener embodying my improvement; Fig. 2, a side view thereof; Fig. 3, a view of the bolt removed from its case; Fig. 4, a transverse section through dotted lines $x$, Fig. 2 and corresponding parts Fig. 1; Fig. 5, a transverse section through dotted lines $z$, Figs. 1 and 2.

The present invention relates to fastening the ordinary door-bolt of the kind shown, so that it cannot be detached from the catch from the opposite side of the door, by a wire.

The invention consists of a pin which is supported by a suitable casting projecting out from one of the thimbles of the case and operated by a coil-spring, that when the bolt is projected into the catch and turned one-fourth round, so as to bring the shank of the knob between the thimbles, the pin will enter a hole in the bolt and lock it fast.

I am aware that spring-catches of various forms have been employed to lock door-bolts; but I am not aware that any such devices or attachments are adapted to be applied to the form of the bolt shown, or that they have the same construction, or such construction as to be operative with the quarter-turn bolt.

A represents the plate, and G H I the thimble, which form the case of the bolt C. B is the plate, and J the thimble, which form the catch thereof.

In casting the thimbles for the plate A all are formed as for the ordinary bolt C, except the thimble G, which has an elevation, D, cast solid thereto, and provided with a hole for a pin, E, to have free reciprocating movement therein. Around this pin E, and between projections P thereon, Fig. 4, and the head of the projection, is placed an ordinary coil-spring, N, which, when the bolt C is turned is projected into the catch B J, and forces the pin into a hole, L, in the bolt C. As will be observed, the hole L in the bolt is formed at right angles to the axis of the shank of the knob K, by means of which the pin E will ride on the bolt at all times, except when the bolt is locked, as shown at Figs. 1 and 2.

Having thus described my invention, what I claim, and desire to secure by Letters Patent, is—

The hollow casting D, projecting out from one thimble of the bolt-case, in combination with the pin E and spring N, having a reciprocating movement through it in locking and unlocking the bolt, riding on the bolt when the latter is not projected into the catch, and locking the bolt only when the knob thereof is turned between the thimbles H I and against the plate A, as specified.

WILLIAM B. PURVES.

Witnesses:
   G. L. CHAPIN,
   A. L. CUMMING.